Dec. 28, 1954 G. F. JAUBERT 2,698,061
FILTERING AND ADSORBING APPARATUS
Filed March 28, 1950 2 Sheets-Sheet 1
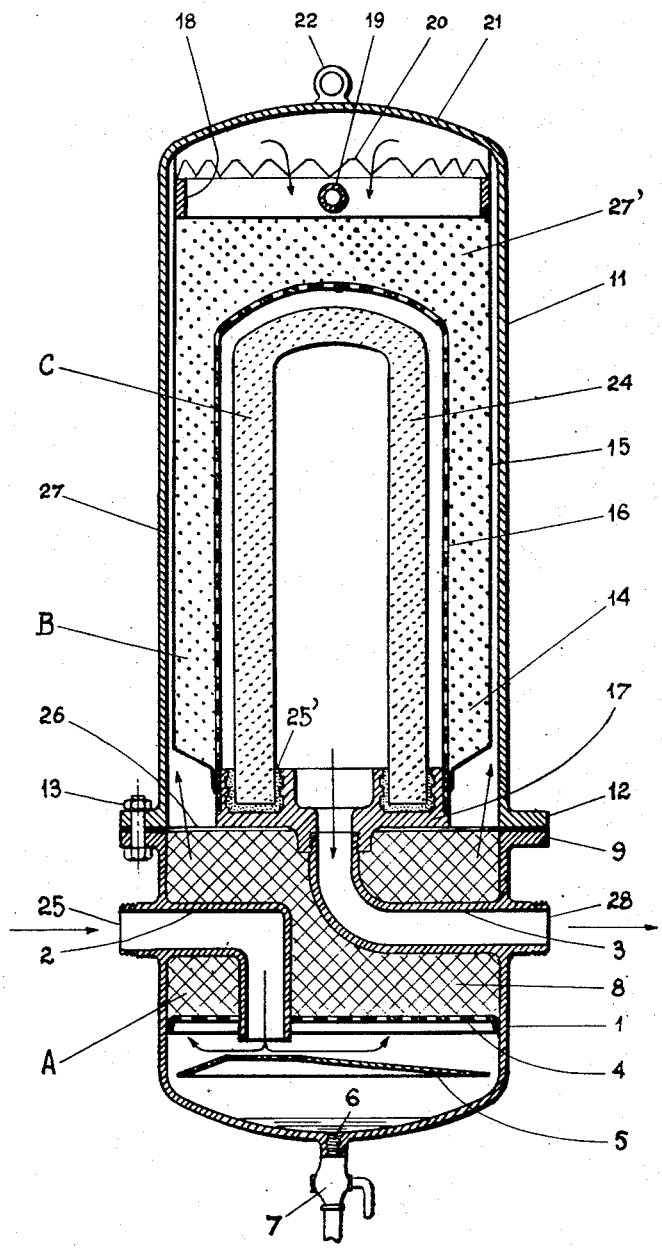
Fig:1
INVENTOR
GEORGE FRANCOIS JAUBERT
BY Bartlett, Eyre, Keel & Weymouth
ATTORNEYS

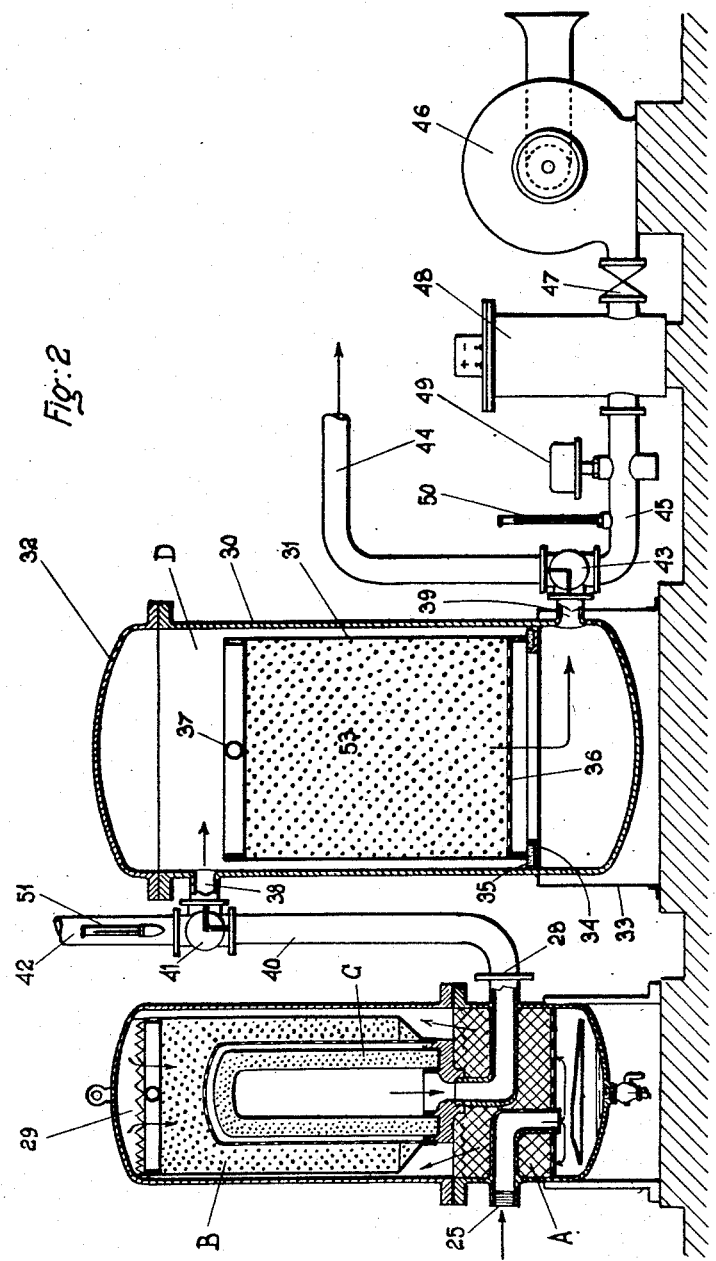

United States Patent Office 2,698,061
Patented Dec. 28, 1954

2,698,061

FILTERING AND ADSORBING APPARATUS

George François Jaubert, Chaville, France

Application March 28, 1950, Serial No. 152,289

5 Claims. (Cl. 183—4.3)

The present invention relates to purifying of compressed gases and more particularly of compressed air. This purifying aims at eliminating especially the oil which may be in suspension in the vesicular or colloidal (aerosol) state or even in the vapor state.

One object of the invention is to provide an apparatus for running compressed gas to be epurated, first through a peat grains bed, and then through a porous ceramic material wall so that a premature dirtying of the porous ceramic material wall is avoided.

Another object of my invention is to provide an apparatus for passing compressed gas through a peat grains bed preceded by the passing of the gas through a shock filtering network for eliminating the greater part of the water and oil in suspension in the gas and enabling the oil to be recovered.

Another object of my invention is to provide an apparatus for passing a gas through a porous ceramic material wall followed by the passing of the gas through a bed of dehydrating material grains for obtaining compressed air at a pressure of 15 to 25 atmospheres, free of oil and water, and suitable to the blow out of the circuit breaker arcs on high voltage wires (220,000 to 440,000 volts).

Other objects of the invention relate to devices for carrying into effect the hereinbefore described invention, these devices being so constructed that they enable an easy maintenance of the members liable to get dirty and to offer but weak resistance to the compressed gas passing therethrough.

These different objects, as well as others, are explained in detail in the following specification read in conjunction with the accompanying drawings forming a part hereof in which:

Fig. 1 is a diagrammatic cross-sectional view of a device constructed according to the invention, more specially adapted for oil separating; and Fig. 2 is a diagram of a plant comprising the device of Fig. 1 in association with a dehydrating apparatus.

Referring now more particularly to Fig. 1 the device comprises three main members: a shock filter A, a peat grains bed filter B and a porous ceramic material filter C.

The shock filter A comprises a tank 1, two pipes 2 and 3 substantially in the form of oppositely extending right angle elbows fastened to the wall of the tank, a perforated metal plate 4 and a baffle plate 5 also fastened to the tank. The bottom of the tank is provided with an aperture 6 with which a drain-cock 7 connects. Filling rings 8 of the kind for example such as Raschig rings or filter means are located in the tank above the perforated metal-plate 4. The tank is also provided with a flange 9 used for establishing connection with the peat grains bed filter B.

This filter B comprises a casing 11 provided with a flange 12 fastened to the flange 9 by means of bolts 13. A basket 14, outwardly limited by the solid wall 15 and inwardly limited by the perforated wall 16, is located inside the casing 11. The basket 14 nests, at its lower part, with easy fit in a seating or circular member 17, screwed onto the pipe 3. The wall 15 is strengthened at its higher part by a ring 18. A cross pipe 19, the ends of which are fastened to the ring 18, is used as a handle for the basket 14. The upper periphery of the wall 15 is cut so as to provide a sequence of teeth 20 which direct the gas flow beneath the head 21 of the casing 11. A ring 22, fastened to the top of the casing, facilitates the removal and the setting of this casing. The peat grains, preferably Dutch peat, are stacked up and well crammed into the basket 14.

The porous ceramic material filter C consists of a hollow self-sustaining candle 24 located inside the perforated wall 16 and sealed with plaster in the housing 25' provided for on the seating 17. The porosity of the material of candle 24 permits the flow of gases therethrough.

The compressed gas to be purified follows the course indicated by the arrows. The gas is introduced at the inlet aperture 25 of the shock filter A, and strikes the baffle plate 5 and passes through the shock filtering network constituted by the filling rings 8. In this network, the gas loses the greater part of the water and oil contained in it in the vesicular state. This water and oil build up a deposit at the bottom of the tank 1 which is from time to time drained by means of the cock 7. Afterward the gas comes to the ring-shaped outlet 26 situated on a level with the flanges 9 and 12. This outlet constitutes both the exhaust port of the shock filter A and the inlet port of the peat grains bed filter B, so there is no loss of head during the passing from one filter to the other.

The gas passes at 27 between the casing 11 and the wall 15 and then into the holes which lie between the teeth 20. The gas then passes through the peat grains bed 27' where it undergoes a very efficient purifying and passes out through the perforated wall 16. This wall constitutes both the exhaust port of the peat filter B and the inlet port of the porous ceramic material filter C, so there is no loss of head in the zone of passing between these two filters. Besides, the gas passes through the candle or plug 24 from the outside to the inside, i. e., the largest passing section is on the side where the biggest oil deposit is; which allows the candle to be used longer. Finally the gas goes out through the exhaust port 28 of the porous ceramic material filter, where it is collected to be used.

The maintenance of the device is easy. When the peat filter is dirty, the through bolts 13 and the casing 11 are disassembled, the basket 14 is raised by means of the handle 19 and it is replaced by a basket containing fresh peat grains. When, after being used for a very long time, the candle 24 is dirty, (which can be detected by means of two sensitive manometers placed one upstream and the other downstream of the filter) the seating 17 is unscrewed and in order to clean the candle 24, it is sufficient to turn it over and to fill it with gasoline, which in a few minutes, removes to the last traces of oil.

The plant shown on Fig. 2 includes an oil separator device 29 similar to the device Fig. 1 and a dehydrating apparatus. This apparatus essentially comprises a tank 30 able to bear the pressure of the compressed gas and a basket 31 containing some grains of a dehydrating material such as silica gel or activated alumina. The tank 30 is closed at its upper part by a removable lid 32 and supported by a seating 33 which is fitted to be used as a heat insulator at the lower part of the tank. A ring 34 fastened inside the tank is used as a stand for the basket 31 and a joint 35 ensures a tight contact between the basket and the ring 34.

The basket 31 is provided with a perforated bottom 36, and a working handle. The tank includes an inlet port 38 and an exhaust port 39. The port 38 is connected with the exhaust port 28 of the porous ceramic material filter C by a pipe 40 including a three way cock 41. A by pass 42 is tapped on cock 41. The port 39 is connected with another three way cock 43, to which two pipes 44 and 45 lead. The plant also includes a ventilator 46, a stop valve 47, a reheater 48, a thermostat 49 and a thermometer 50 tapped on the pipe 45 and a thermometer 51 tapped on the pipe 42.

The normal circulation of the compressed gas is indicated by the arrows, that is, the gas enters at 25 and goes out at 28 of the oil separator device 29, after following the course hereinbefore mentioned with reference to Fig. 1. It is then thoroughly free of oil but it may still contain some water. The gas is then admitted by the port 38 into the dehydrating apparatus D, and passes through the mass 53 of dehydrating material grains and comes out by the port 39. The cock 43 finally leads the dehydrated gas to the main 44, where it is collected to be used.

When it is necessary for the dehydrating material to be regenerated, the cocks 41 and 43 are turned so as to cause on the one hand port 38 to be connected with 42, and on the other hand pipe 45 to be connected with port 39. The valve 47 is opened, and the ventilator 46 and reheater 48 are set in operation. As a result a hot draft passes upwards through the mass of grains 53 which gradually gets rid of the water which has impregnated it before. The thermostat 49 regulates the temperature of the hot air, by acting upon the reheater 48; and the thermometers 50 and 51 allow the regenerating operation to be controlled.

The plant Fig. 2 is particularly suitable to the purifying of the compressed air used for the control of air circuit breakers and the blow out of arcs on high voltage lines. These circuit-breakers set up in the open air act under very changeable conditions. During the summer months, the previous compression of the air at a pressure ranging from 15 to 25 atmospheres, and the passage of the air through the device 29 removes nearly the whole of the water which might be entrained in this air, so that it is not necessary to use the basket 31 and the tank 30 is then used as a mere compressed air reserve.

During the winter months, the basket 31 with its mass of dehydrating material grains is put in, and perfectly filtered and dry air is obtained, whatever may be the cold affecting the plant.

All the devices above mentioned are not indispensible, and depend upon the kind and quantity of the impurities to be removed. If, for instance, the air is compressed by means of an unoiled compressor, such as a diaphragm compressor, only the filtering through the peat may be used, and eventually the filtering through the porous candle, or through the dehydrating material.

It will also be understood that the invention is not necessarily exclusively limited to the hereinbefore shown and disclosed examples and that many other embodiments are possible, all within the spirit and scope of the appended claims.

What I claim is:

1. A filter for gas comprising a cylindrical tank closed at the bottom and open at the top thereof and including a pair of substantially right angularly disposed tubular elbows extending through the side walls of the tank, one of said elbows being directed downwardly toward the closed end of the tank and the other of said elbows being directed upwardly through the open end of the tank, filter means located in said tank surrounding said elbows, one of said elbows constituting a gas intake and the other of said elbows constituting a gas discharge, a circular member carried by the interior terminating end of said last mentioned elbow, said circular member forming a carrier for a cylindrical porous ceramic filter open at the end which connects with said last mentioned elbow and closed at the other end thereof, an additional filter carried by said circular member in annular spaced relation to the aforesaid porous ceramic filter, and a casing enclosing said additional filter and secured to the open top of said cylindrical tank.

2. A filter for gas as set forth in claim 1 in which said additional filter is constituted by a double wall cylindrical container having an annular space therein filled with crammed peat.

3. A filter for gas as set forth in claim 1 in which said additional filter is interiorly spaced from the interior side wall of said casing for the passage of gas from said gas intake elbow upwardly through the filter means in said tank and around the annular space between said additional filter and the interior of said casing and through said additional filter and thence through said porous ceramic filter and through said gas discharge elbow.

4. A filter for gas as set forth in claim 1 in which a wall of said additional filter supports a ring member which in turn centers the top of said casing in position around said additional filter, said ring member being serrated on its upper periphery for providing passage for gas from a path between the outside of said additional filter and the inside wall of said casing through said additional filter and said porous ceramic filter.

5. A filter for gas as set forth in claim 1 in which a circular baffle plate extends diametrically across said tank intermediate the closed bottom thereof and the gas intake elbow for directing gas upwardly through said filter means.

References Cited in the file of this patent

UNITED STATES PATENTS

| Number | Name | Date |
|---|---|---|
| 813,516 | Pfautz | Feb. 27, 1906 |
| 1,514,737 | Smith | Nov. 11, 1924 |
| 1,541,147 | Ikeda et al. | June 9, 1925 |
| 1,732,819 | Pehrson | Oct. 22, 1929 |
| 1,965,461 | Gray | July 3, 1934 |
| 2,048,993 | Claffey et al. | July 28, 1936 |
| 2,273,779 | Dickey et al. | Feb. 17, 1942 |
| 2,379,321 | Sutcliffe et al. | June 26, 1945 |
| 2,606,628 | Hasselwander | Aug. 12, 1952 |

FOREIGN PATENTS

| Number | Country | Date |
|---|---|---|
| 560,123 | Great Britain | Mar. 21, 1944 |